Patented July 30, 1929.

1,722,554

UNITED STATES PATENT OFFICE.

THEODORE F. BRADLEY, OF MONTCLAIR, NEW JERSEY.

SYNTHETIC RESIN COMPOSITION AND PROCESS OF MAKING SAME.

No Drawing. Application filed May 29, 1924, Serial No. 716,571. Renewed August 23, 1928.

This invention relates to molding compositions and molded articles prepared from a synthetic resin and a filler and relates especially to resins prepared by the reaction of organic acids on glycerol, polyglycerol, glycol and the like and to fillers of a fibrous or flaky nature especially to mica in sheet or flake form.

The object of the invention is to produce a molding composition which on hot pressing for a short time in suitable molds will yield heat resistant molded articles and especially sheets of various thicknesses built up from flaky material such as mica cemented by resinous material, as will be hereinafter described, which has the property of hardening when exposed to an appropriate temperature.

I shall first describe a series of resins some of which are quite dissimilar in chemical character but all of which, in one form or another, may be used in carrying out the present invention.

*Example 1.*—Products of various degrees of fusibility, toughness, hardness and solubility can be obtained according to the proportions and kinds of ingredients used, for example a very hard and quick-setting resin may be obtained by heating the following mixture: Congo resin 1000 grams, phthalic anhydride 246⅔ grams, glycerol 203⅓ grams. These materials are heated slowly in a suitable container to 230° C. using mechanical agitation throughout. The product is then poured int suitable containers and may be dissolved in benzol, toluol, and benzol-alcohol or benzol-acetone mixtures. This solution is then mixed with suitable fillers and further heat-treated to obtain an infusible and insoluble resin.

*Example 2.*—A more fusible and more brittle resin is obtained as follows: rosin 500 grams, Congo resin 500 grams, phthalic anhydride 246⅔ grams, glycerol 203⅓ grams. These ingredients are placed in suitable container and heated to 230° C. with continuous agitation. The mixture is then poured into a suitable container. This gives a very quick-setting product when made in this way. The hardening properties of this resin may be somewhat changed by first giving the rosin and Congo a preliminary heat-treatment which results in a more fusible and slower setting resin. In order to obtain such a product the rosin and Congo are heated at 315° C. for 1½ hours then cooled to 260° C. and combined with the other ingredients as previously described.

*Example 3.*—A very soluble and slow-setting resin can be obtained from rosin, phthalic anhydride and glycerol without the use of any Congo. The physical properties may be modified according to the amount of rosin used. For example a mixture of 18¾ pounds phthalic anhydride, 21 pounds glycerol, 81 pounds rosin are placed in an aluminum kettle and heated to 290° C. with continuous mechanical agitation. This temperature should be reached in not less than 2½ hour or more than 3 hours. When this temperature is attained heating is discontinued and the batch allowed to cool to 200° C. at which temperature the resin is poured into suitable containers. This resin is soluble in benzol and toluol or mixtures of these hydrocarbons with acetone and denatured alcohol. The resin has a very low acidity, having an acid number of approximately 10 and a melting point of 89° C. When combined with fillers and further heat-treated an infusible product may finally be obtained although this resin does not harden as quickly as the Congo or Congo-rosin complexes. A harder, tougher and quicker-setting rosin complex is obtained as follows: 740 grams phthalic anhydride, 420 grams glycerol, 920 grams rosin heated to 290° C. with continuous agitation for 2½ to 3 hours. This is cooled to 200° C. and poured into suitable containers. This resin is not soluble in benzol alone but becomes soluble in a mixture of equal parts denatured alcohol and benzol.

The proportions as given in the above examples correspond to 40 parts of Congo resin (or Congo resin plus rosin), to about 9 parts of phthalc anhydrid and about 8 parts of glycerol, which proportions are novel in this art, and while slight variation in the proportions is permissible, the best results will follow from the use of about the proportions stated.

In place of the phthalic anhydride other di- or tribasic organic acids may be substituted for example citric, tartaric, malic, maleic, diphenic, benzoyl benzoic and similar acids may be used. Each of these acids produces products of different degrees of hardness, melting point, solubility, waterproofness, etc., and the particular acid to be used depends upon the properties desired.

Suitable resins may be obtained from the glycerides of any of these acids with or without the glycerides of rosin, Congo, dammar and other natural acid resins. For example a good resin may be obtained from phthalic anhydride and glycerol and the properties of this resin may be modified according to the proportions of phthalic anhydride used. For a quick-setting resin the following proportions are used: 444 grams phthalic anhydride, 188 grams 98 per cent C. P. glycerol. These are heated to 233° C. in suitable container with continuous agitation and poured into suitable molds. A slower setting and less acid resin may be obtained as follows: 376 grams phthalic anhydride, 188 grams 98 per cent C. P. glycerol. This product was made in the same manner. A still slower setting and less acid resin was made as follows: 148 grams phthalic anhydride, 94 grams 98 per cent C. P. glycerol. This resin is made as described above. These resins are all soluble in acetone, methyl ethyl ketone, furfural, and in mixtures of acetone and benzol, acetone and denatured alcohol, furfural and benzol, furfural and denatured alcohol and also in a solvent composed of equal parts by volume of denatured alcohol and benzol. Somewhat cheaper solvents may be obtained by dispersing these resins in aqueous solvents by means of emulsifying agents such as soaps, glue, casein, etc., said emulsification being aided considerably by the presence of a small amount of alkali preferably ammonia. The aqueous dispersion may be obtained by means of a colloid mill or the resins may be dissolved in alcohol, benzol or acetone or similar solvents and then emulsified with water, using a small amount of ammonia and suitable protective colloidal substances.

In place of the phthalic anhydride other di- and tribasic organic acids may be used when present in suitable proportions. For example a suitable resin may be made from citric acid and glycerol using the following proportions: 250 grams citric acid, 100 grams 98 per cent C. P. glycerol. These ingredients are heated to 190° C. with agitation and then poured into molds to cool. This resin is soluble in the same solvents as the phthalic glyceride resin. Another resin having a very rubbery and flexible nature is obtained from succinic acid. This resin is made as follows: 150 grams succinic acid, 100 grams 98 per cent C. P. glycerol. This was heated to 240° C. and poured into molds. Owing to the great flexibility of this resin it is valuable as a softener when admixed with phthalic glyceride or the various other resins previously described. It is soluble in the same solvents as phthalic glyceride resin.

These resins as described when properly made are soluble in the previously described solvents and their solutions form the basis for valuable molding compositions and cements.

One particular application of these solutions for molding work is for mica plate. Shellac has heretofore been used for this type of work but owing to the high cost and lack of uniformity this can be replaced advantageously with resins as herein described. The mica plate may be made by applying solutions of these resins to the flake mica and heat is then applied to volatilize the solvent therefrom. Mica is laid in layers of suitable thickness and enough heat is applied to soften the resin sufficiently so as to thoroughly bind the mica together. These sheets so formed are then heated in hydraulic presses under suitable pressure and temperature to produce an infusible and insoluble resinous binder.

The particular resin to be used is determined according to the flexibility, hardness and molding qualities desired. For ordinary mica plate such as is used for commutator segments and for electric flat iron resistance insulation I prefer to use solutions of Congo phthalic glyceride or phthalic glyceride resins. Where better molding and slower setting resins are desired I utilize the rosin or rosin Congo phthalic glyceride complexes, and where greater flexibility is desired I utilize the succinic and citric glycerides or combinations of these and the other harder resins above mentioned. For example a mica plate suitable for resistance insulation in electric flat irons ordinarily is made up to a thickness of approximately 7 mils. The actual content of resinous binder will vary according to the firmness and hardness desired. This will run from 2 per cent to 6 per cent in general and in order to obtain a 2 per cent resinous content I use a solution of Congo phthalic glyceride or phthalic glyceride resin containing approximately 1/2 pound of resin to the gallon. This is sprinkled onto the flaked mica and the solvent then evaporated. The cemented mica so obtained is then subjected to a heat and pressure treatment in suitable hydraulic presses at a temperature of from 200 to 230° C. and 4000 pounds per square inch pressure. The heating and pressure is continued for a period of from 20 to 30 minutes after which the presses are opened and the plate removed. The mica plate is then surfaced and reduced to a uniform thickness and cut into suitable shape for this type of product. I have determined that Congo rosin phthalic or phthalic glycerides give a better product for this type of work than that obtained with shellac as the resinous binder. A harder and firmer plate is obtained from these synthetic resins with less actual resinous material than when shellac is used and I have also determined that a more heat resistant product is obtained.

Other types of molding compositions may be made with these resins and very good insulating products have been made from paper, asbestos and other fibrous materials impregnated with solutions of these resins, dried free from volatile thinner and then heated under pressure to obtain an infusible and insoluble resin. Wood flour, asbestos fibre, cotton linters, silex, asbestine and other fillers may be used wherever occasion demands and many types of molded products may be made from these various fillers combined with the resins as described. Various dyes or pigments may be added in order to obtain any desired color.

As each individual resin or resinous complex has a different critical temperature at which polymerization occurs with the formation of an insoluble and infusible or partially fusible polymer the temperature to be used is dependent upon the resin. For Congo phthalic, Congo rosin phthalic and phthalic glycerides I prefer to use a temperature of 230° C. or thereabouts in order to obtain an infusible product in as short a time as possible. Lower temperatures may be used but these will require a considerably longer time. From 2000 to 5000 pounds per square inch pressures are used, the exact pressure being dependent upon the type of product being manufactured.

In general I prefer to carry out the reactions in producing the resins aforesaid to such a degree that they become highly sensitive to further heating. The object of this treatment is to obtain material which polymerizes or becomes converted on the further application of heat to yield an infusible product or one which is sufficiently heat-resistant to meet the requirements of the trade. An important consideration in making molded articles or sheeted material with these resins and mica and the like is the time required in the hot press to bring about the conversion. Mineral fillers permit of raising the temperature of the press considerably higher than is the case when organic fillers such as paper and the like are used. Accordingly I prefer to employ an all-mineral filler such as mica alone or mixtures of mica, asbestos and other mineral substances. Using such fillers and the maximum press temperature in conjunction with the employment of a highly sensitive resin a considerably shortened time of molding or curing results.

What I claim is:—

1. A composition of matter comprising as a binder, a resinous complex containing the reaction products of Congo resin, phthalic anhydride and glycerol, in combining proportions.

2. A resinous complex consisting of the reaction products of Congo resin, ordinary rosin, phthalic anhydride and glycerol, in combining proportions.

3. A resinous complex consisting of a resinous reaction product of Congo resin, phthalic anhydride and glycerol, in the proportions of about 40:9:8, respectively.

4. A composition of matter comprising as a binder, a resinous complex consisting of the reaction products of about 40 parts of Congo resin and rosin, about 9 parts of phthalic anhydride and about 8 parts of glycerol.

5. A synthetic resin complex comprising the reaction products of a natural acid resin, glycerol and phthalic anhydride, in about the proportions of 40:8:9, at least one half of the natural acid resin being Congo resin.

6. A resinous complex consisting of the reaction products of Congo resin, an organic carboxylic acid, and a poly hydroxy alcohol, in combining proportions.

7. A resinous complex comprising the reaction products of Congo resin, rosin, phthalic anhydride and a poly hydroxy alcohol, in combining proportions.

8. A resinous complex produced from a heat-treated natural resin, an organic carboxylic acid and a poly hydroxy alcohol.

9. A resinous complex produced from a heat-treated Congo resin, phthalic anhydride and a poly hydroxy alcohol.

10. A resinous complex consisting of the reaction products of heat-treated Congo resin and rosin, phthalic anhydride and glycerol.

11. As an article of manufacture, a highly heat-sensitive reaction complex of a natural resin, a poly hydroxy alcohol, and an organic carboxylic acid.

12. A resinous complex as set forth in claim 1, having a low acid number.

13. A resinous complex consisting of the reaction complex of Congo resin, an organic carboxylic polybasic acid, and a polyhydroxy-alcohol, in combining proportions.

14. A resinous complex produced from a heat-treated natural resin, an organic, polybasic, carboxylic acid, and a polyhydroxy alcohol.

THEODORE F. BRADLEY.